(12) United States Patent
Sinha et al.

(10) Patent No.: US 11,189,265 B2
(45) Date of Patent: Nov. 30, 2021

(54) SYSTEMS AND METHODS FOR ASSISTING THE HEARING-IMPAIRED USING MACHINE LEARNING FOR AMBIENT SOUND ANALYSIS AND ALERTS

(71) Applicants: Ria Sinha, San Jose, CA (US); Rishi Amit Sinha, San Jose, CA (US)

(72) Inventors: Ria Sinha, San Jose, CA (US); Rishi Amit Sinha, San Jose, CA (US)

(*) Notice: Subject to any disclaimer, the term of this patent is extended or adjusted under 35 U.S.C. 154(b) by 184 days.

(21) Appl. No.: 16/747,697

(22) Filed: Jan. 21, 2020

(65) Prior Publication Data

US 2021/0225365 A1     Jul. 22, 2021

(51) Int. Cl.
| | | |
|---|---|---|
| G10L 15/08 | (2006.01) | |
| G10L 21/0208 | (2013.01) | |
| G06K 9/62 | (2006.01) | |
| H04R 3/04 | (2006.01) | |

(Continued)

(52) U.S. Cl.
CPC ............. *G10L 15/08* (2013.01); *G06F 9/542* (2013.01); *G06K 9/6256* (2013.01); *G06K 9/6268* (2013.01); *G06N 20/00* (2019.01); *G10L 21/0208* (2013.01); *H04R 3/04* (2013.01)

(58) Field of Classification Search
CPC ......... A61B 5/1495; G06F 3/16; G06F 9/542; G06F 3/013; G06F 40/279; G06K 9/6256; G06K 9/6268; G06N 20/00; G08B 13/1672; G10L 15/005; G10L 15/063; G10L 15/08; G10L 15/26; G10L 15/30; G10L 17/04; G10L 21/0208; G10L 25/51; H03G 3/32; H04R 3/005; H04R 3/04; H04R 25/652; H04R 1/1083; H04S 7/302; G08G 1/0962; H04L 51/24; H04W 52/027

USPC .......... 340/384.1, 573.1; 704/231, 235, 265, 704/271; 379/52; 381/60

See application file for complete search history.

(56) References Cited

U.S. PATENT DOCUMENTS

| | | | |
|---|---|---|---|
| 5,796,328 A * | 8/1998 | Golant ................. | B65D 5/4291 340/328 |
| 6,754,627 B2 * | 6/2004 | Woodward ............. | G10L 15/22 704/235 |

(Continued)

OTHER PUBLICATIONS

World Health Organization: WHO. (Mar. 20, 2019). Deafness and hearing loss, https://www.who.int/news-room/fact-sheets/detail/deafness-and-hearing-loss.

(Continued)

*Primary Examiner* — Gerald Gauthier
(74) *Attorney, Agent, or Firm* — Clements Bernard Baratta; Lawrence A. Baratta, Jr.

(57) ABSTRACT

Systems and Methods for assisting the hearing-impaired are described. The methods rely on obtaining audio signals from the ambient environment of a hearing-impaired person. The audio signals are analyzed by a machine learning model that can classify audio signals into audio categories (e.g. Emergency, Animal Sounds) and audio types (e.g. Ambulance Siren, Dog Barking) and notify the user leveraging a mobile or wearable device. The user can configure notification preferences and view historical logs. The machine learning classifier is periodically trained externally based on labelled audio samples. Additional system features include an audio amplification option and a speech to text option for transcribing human speech to text output.

17 Claims, 6 Drawing Sheets

(51) Int. Cl.
*G06N 20/00* (2019.01)
*G06F 9/54* (2006.01)

(56) References Cited

U.S. PATENT DOCUMENTS

| | | | | |
|---|---|---|---|---|
| 6,934,684 | B2* | 8/2005 | Alpdemir | G06Q 30/02 379/88.03 |
| 7,034,691 | B1* | 4/2006 | Rapaport | G06Q 10/10 340/573.1 |
| 7,676,372 | B1* | 3/2010 | Oba | G10L 21/0364 704/271 |
| 9,940,801 | B2* | 4/2018 | Phillips | H04L 67/12 |
| 10,904,669 | B1* | 1/2021 | Talakoub | G02B 27/017 |
| 10,905,337 | B2* | 2/2021 | Tran | H04R 25/604 |
| 2003/0072420 | A1* | 4/2003 | Feigenbaum | G09B 21/00 379/52 |
| 2003/0125940 | A1* | 7/2003 | Basson | G10L 15/30 704/231 |
| 2008/0107278 | A1* | 5/2008 | Roeck | H04R 25/70 381/60 |
| 2015/0179188 | A1* | 6/2015 | Yassa | A61F 11/04 704/231 |
| 2016/0111111 | A1* | 4/2016 | Levitt | G10L 15/24 704/231 |
| 2018/0161683 | A1* | 6/2018 | Thomas | A63F 13/87 |
| 2018/0176746 | A1* | 6/2018 | Kapatralla | H04L 65/1059 |
| 2018/0277100 | A1* | 9/2018 | Cassagne | G10L 15/005 |
| 2020/0035247 | A1* | 1/2020 | Boyadjiev | G06K 9/00536 |
| 2020/0104194 | A1* | 4/2020 | Chalmers | G06F 1/163 |
| 2020/0160881 | A1* | 5/2020 | Gadgil | G06N 3/08 |
| 2020/0268260 | A1* | 8/2020 | Tran | A61B 5/6898 |
| 2020/0296510 | A1* | 9/2020 | Li | G06F 3/167 |
| 2020/0304934 | A1* | 9/2020 | Yu | H04R 5/04 |
| 2020/0372796 | A1* | 11/2020 | Gajapala | G08G 1/0112 |
| 2020/0380979 | A1* | 12/2020 | Meacham | G10L 21/0208 |
| 2020/0401466 | A1* | 12/2020 | Frost | G10L 15/26 |
| 2021/0020191 | A1* | 1/2021 | Venneti | G06F 3/16 |
| 2021/0027893 | A1* | 1/2021 | Nematihosseinabadi | A61B 5/0022 |
| 2021/0035422 | A1* | 2/2021 | Sherman | H04R 29/005 |
| 2021/0110812 | A1* | 4/2021 | Naylor-Teece | G10L 25/69 |
| 2021/0225365 | A1* | 7/2021 | Sinha | G06K 9/6268 |

OTHER PUBLICATIONS

WebMD. (May 14, 2012). Treatments for Hearing Loss. https://www.webmd.com/a-to-z-guides/hearing-loss-treatment-options.

Mational Institute on Deafness and Other Communication Disorders: NIDCD. (Nov. 12, 2019). Assistive Devices for People with Hearing, Voice, Speech, or Language. https://www.nidcd.nih.gov/health/assistive-devices-people-hearing-voice-speech-or-language-disorders.

Department of Health (2005). Mental health and deafness—Towards equity and access: Best practice guidance. London, UK: HMSO.

Hearing Loss Association of America: HLAA. (2019). Types, Causes and Treatments, https://www.hearingloss.org/hearing-help/hearing-loss-basics/types-causes-and-treatment/.

National Institute on Deafness and Other Communication Disorders: NIDCD. (Jun. 15, 2018). Hearing Aids, https://www.nidcd.nih.gov/health/hearing-aids.

Rains, T. (Sep. 13, 2019). How much do hearing aids cost? https://www.consumeraffairs.com/health/hearing-aid-cost.html.

Wikipedia. (Nov. 24, 2019b). Cochlear implant. https://en.wikipedia.org/wiki/Cochlear_implant.

Gallaudet University and Clerc Center. (2019). Assistive Technologies for Individuals Who are Deaf or Hard of Hearing, https://www3.gallaudet.edu/clerc-center/info-to-go/assistive-technology/assistive-technologies.html.

Apple. (Sep. 19, 2019). Use Live Listen with Made for iPhone hearing aids, https://support.apple.com/en-us/HT203990.

Gemmeke, J. (2017). Audio Set: An ontology and human-labeled dataset for audio events. https://research google.com/audioset/.

Salamon, J. et al., (2014). A Dataset and Taxonomy for Urban Sound Research. https://urbansounddataset.weebly.com/.

Fonseca, E. (2019). Freesound Datasets: A Platform for the Creation of Open Audio Datasets. https://annotator.freesound.org/fsd/explore/.

* cited by examiner

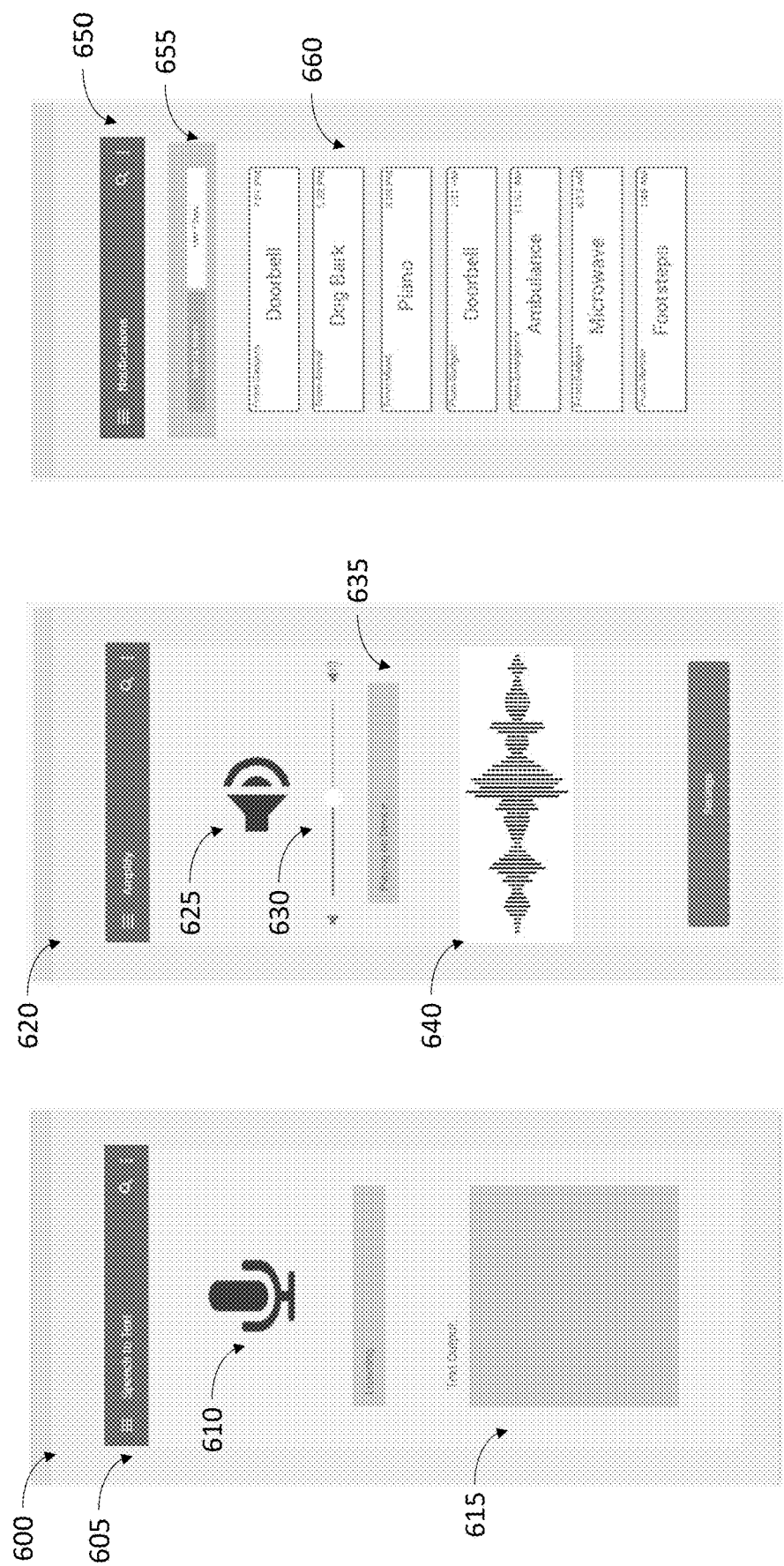

SYSTEMS AND METHODS FOR ASSISTING THE HEARING-IMPAIRED USING MACHINE LEARNING FOR AMBIENT SOUND ANALYSIS AND ALERTS

FIELD OF THE DISCLOSURE

The present disclosure generally relates to systems and methods to help the hearing-impaired understand ambient sounds in their environment. More particularly, the present disclosure relates to machine learning based systems that can learn about ambient sounds and assist the hearing-impaired understand them via mobile or embedded device-based notifications.

BACKGROUND OF THE DISCLOSURE

According to the World Health Organization, 466 million people worldwide, or about 6% of the population, including 34 million children, suffer from disabling hearing loss (WHO, 2019). It is estimated that by 2050 over 900 million people will have disabling hearing loss. Disabling hearing loss refers to hearing loss greater than 40 decibels.

Individuals in the deaf and hearing loss community have faced discrimination and oppression for centuries. This has caused challenges for them in terms of employment, higher education, and other privileges that their hearing counterparts take for granted. They are often stereotyped and marginalized in society, and their communication barriers have led to a strained relationship with the rest of the community making it difficult for them to live normal daily lives. A study published by the British Department of Health suggests that hearing-impaired individuals are 60% more susceptible to mental health and social anxiety issues than their counterparts with normal hearing abilities (Department of Health, 2005).

Several causes have been identified for hearing loss. The Hearing Loss Association of America (HLAA) has categorized hearing disabilities into two classes: (i) conductive, which include problems associated with the ear drum, ear canal, and middle ear function, and (ii) sensorineural, which include issues that affect inner ear functions as well as the brain and nervous system that interpret auditory inputs (HLAA, 2019). Conductive hearing loss is prompted by ear infections, benign tumors, excessive ear fluid and/or ear wax, or poor function of the ear tubes. As for sensorineural issues, researchers have labeled traumatic events, aging, hereditary, and virus or immune diseases as primary causes. Because of the multitude and diverse range of issues that lead to this disability, many individuals are affected and require additional assistance in their daily lives.

The most popular solution for hearing loss is the hearing aid (NIDCD, 2018). Hearing aids are electronic devices generally worn behind or inside the ear. The device is usually battery powered. It receives sound through an embedded microphone, which converts the sound waves to electrical signals that are processed, amplified and played back using a speaker. The amplifier increases the power of the sound signal that would normally reach the ear, allowing the hearing-impaired user to listen. Hearing aids are primarily useful for people suffering from sensorineural hearing loss which occurs when some of the small sensory cells in the inner ear, called hair cells, are damaged due to injury, disease, aging, or other causes. Surviving hair cells leverage the amplified sound signal generated by the hearing aid to compensate for the loss of perception that would occur otherwise and convert the received sound signal into impulses sent to the brain via the auditory nerve. However, if the inner ear is too damaged, or the auditory nerve has problems, a hearing aid would be ineffective. The cost of a hearing aid can range from $1,000 to $6,000 (Rains, 2019).

For people suffering from profound hearing loss, cochlear implants may be an option. Cochlear implants are surgically implanted neuro-prosthetic devices that bypass sensory hair cells used in the ear for normal hearing and attempt to directly stimulate the auditory nerve with electrical signals. With prolonged therapy and training a hearing-impaired person may learn to interpret the signals directly sent to the auditory nerve as sounds and speech. In the US, cochlear implants can cost approximately $100,000, and for pre-lingually deaf children the risk of not acquiring spoken language even with an implant may be as high as 30% (Wikipedia, 2019b).

A variety of assistive technologies have emerged over the years to the help the hearing-impaired. These include FM radio-based systems that transmit radio signals from a speaker to a listener and audio induction loop systems that pick up electromagnetic signals using a telecoil in a hearing aid, cochlear implant, or headset (Gallaudet, 2019). Mobile devices with touch screens and real-time text to speech transcription capabilities are starting to get used as well. Closed captioning is becoming standard in streaming media as well as television programs. Apple recently launched a feature called "Live Listen", on iOS mobile devices (e.g. iPhone, iPad) where the device becomes a remote microphone placed close to a speaker and a BlueTooth headset replays the sound live (Apple, 2019). This can be useful when you are trying to hear a conversation in a noisy room or for a hearing-impaired student trying to listen to a teacher across the classroom.

These conventional approaches to assisting the hearing-impaired attempt to create a real-time listening experience similar to a normal person by using technology to work around the defects of the ear. They can be expensive and sometimes aesthetically undesirable. Hearing aids are battery powered and not something a user would like to wear all the time. There are several situations where a hearing-impaired user may just want to be notified about interesting ambient sounds without having to wear a hearing aid. For example, a user may be sleeping and may want to get alerted if there is a knock on the door, a baby crying, a smoke alarm going off or other similar audio events that warrant some action. A digital assistant that can actively listen, process and notify the user via a vibration alert on a smart watch can be very useful in these circumstances. Hearing-impaired people often get anxious when they are in new surroundings because systems they have in their house (e.g. a visual doorbell or telephone) may not be available in say a hotel. Having a digital assistant that can intelligently process ambient sounds and notify them via their mobile device can be very useful in these circumstances and allow the hearing-impaired user to operate more confidently. The digital assistant should be customizable such that the user can specify notification preferences based on audio categories, audio types, time of day, location, etc, and also allow the user the view historical alerts. The assistant can run as an app on a mobile device or integrate with smart listening devices such as Amazon Alexa and Google Home that have omnidirectional microphone arrays that can pick-up sounds coming from any direction.

BRIEF SUMMARY OF THE DISCLOSURE

In an exemplary embodiment, a system to assist the hearing-impaired comprises of an audio receiver communicatively coupled to a processing system and a notification system. The processing system obtains audio signals from the audio receiver and first runs signal processing steps to reduce background noise and interference. Subsequently, it runs a machine learning based classifier to analyze the audio signal and classify it into an audio category and audio type. The user is then notified, based on their preferences, with a summary of the classified audio, and, for the specific type of audio, the user is presented with a meaningful description of what the machine learning classifier identified the signal as. Notifications can be stored in the system for historical viewing. Optionally, the system may include an amplifier and filter to output the received audio signal to an audio output of the user's choice or store it as an audio file for future playback. The system can also include a speech to text module that can decipher human speech and provide a text transcript of the speech in real-time on the user's notification screen. The system's machine learning classifier is periodically trained externally based on labelled audio data and updated in the system automatically or manually. Methods for training the system are based on data science principles and a variety of machine learning algorithms from simple regression to sophisticated deep learning based neural networks may be utilized based on accuracy, complexity and training cost trade-offs.

BRIEF DESCRIPTION OF THE DRAWINGS

The present disclosure is illustrated and described herein with reference to the various drawings, in which like reference numbers are used to denote like system components/method steps, as appropriate, and in which:

FIG. 6 is a mobile device app showing examples of user notifications and interactions.

DETAILED DESCRIPTION OF THE DISCLOSURE

In various embodiments, the present disclosure relates to systems and methods for assisting the deaf and hearing-impaired. The systems and methods may use mobile devices or other smart technology (e.g. mobile devices—iPhone, Android device, tablets, smart watches, etc.) that can detect and process ambient sounds, output information, respond to user signals (e.g. via audio or touch) and store data sets. These features combined helps develop a system where the hearing-impaired can utilize technology to inform them of nearby sounds by classifying them into audio categories and types. Examples of audio categories include Animal Sounds, Emergency, Devices, Vehicles, Speech, Music, etc. Each audio category can have multiple specific audio types, e.g., for the audio categories listed above, specific audio types could be Dog Barking, Ambulance Siren, Telephone Ring, Garbage Truck, English Conversation, Piano, etc.

Figure 1:
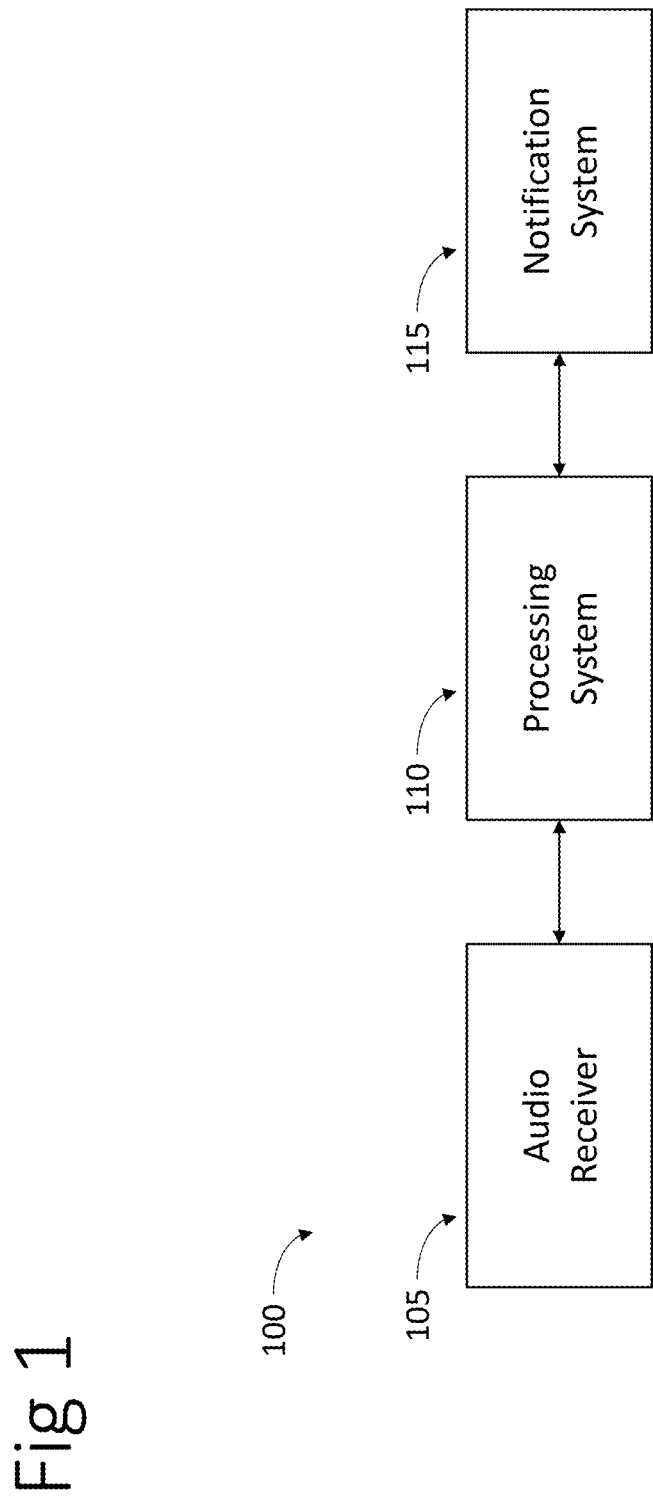
FIG. 1 is a block diagram of the system for assisting hearing-impaired persons.

FIG. 1 includes a system 100 which comprises of an audio receiver 105 connected to a processing system 110 connected to a notification system 115. In an example embodiment, the audio receiver 105 could be a microphone that is coupled with the processing system (e.g. a microphone on a mobile device or laptop) or an external device like Alexa or Google Home that can capture audio samples and send it to the processing system using an Application Programming Interface (API). The processing system 110 analyzes the received audio signal to detect and classify different sounds, and based on user preferences, send an appropriate notification to the user. In an example embodiment, the processing system could be an app running on a mobile device or a program running on an embedded system (e.g., a Raspberry Pi module). The notification system 115 communicates directly with the user based on selected preferences. In an example embodiment, the notification system could be a push notification on a mobile device, a vibration alert on a smart watch, or other visual forms of notification using LEDs or display technology.

Figure 2:
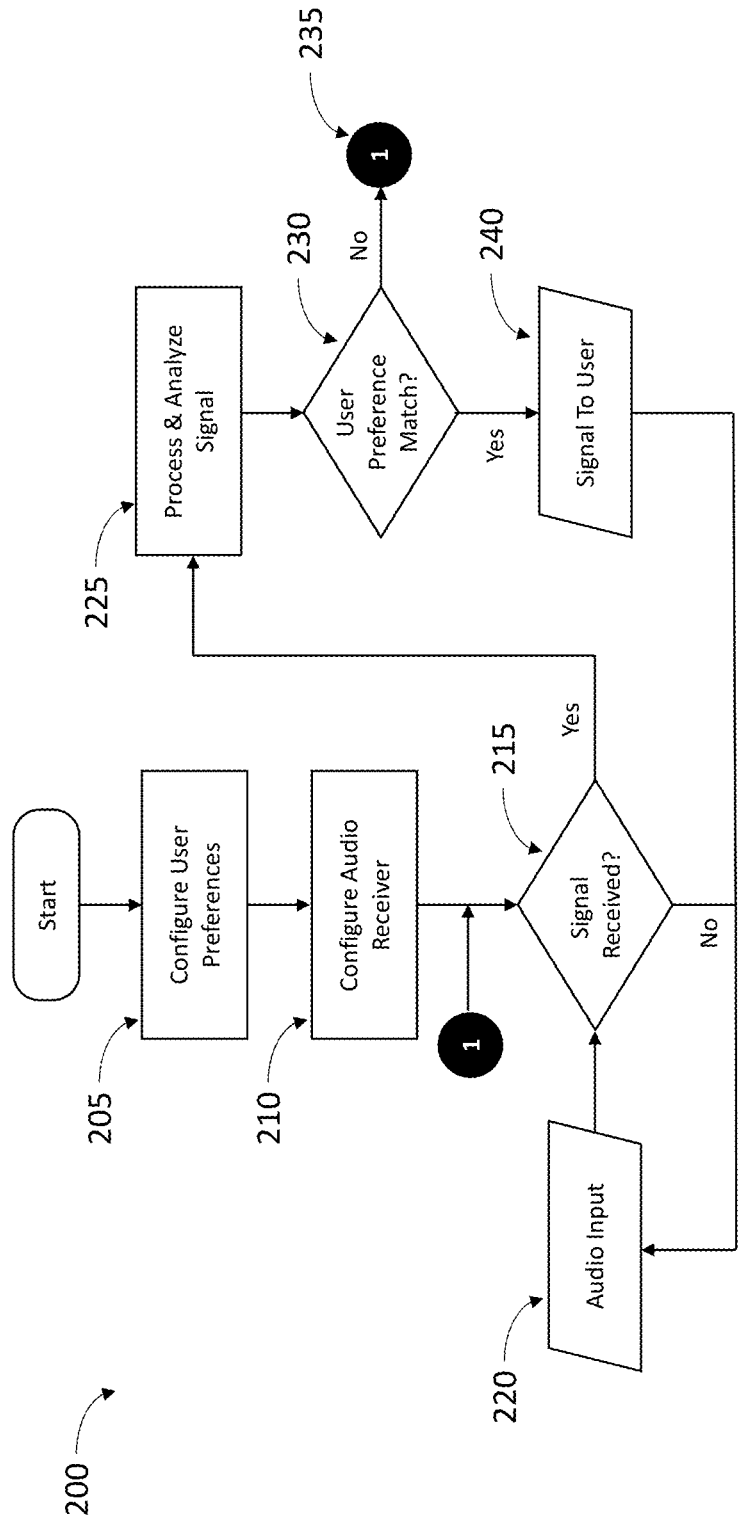
FIG. 2 is a high-level flowchart of operation of the system of FIG. 1.

FIG. 2 illustrates an overall operational flowchart 200 of an example system. The user configures the system 205 based on their preferences for what, when, and how they would like to be notified. This may be done through user preferences setting on the application software, or in the settings app of an Apple or Android device or configured with hardware buttons on an embedded device. Users can configure their preferences based on what sounds or categories of sounds they would like to be notified of (e.g. Animal Sounds, Emergency, Devices, Vehicles, Speech, Music, etc.), and they can also choose how they would like to be notified (e.g. through a text message, vibration alert, or another methods discussed in 115). Furthermore, they can decide when they want to be notified (e.g. at work, at home, or in a public setting) and they can adjust when they want the system to be active (e.g. some users may want to use the system when they don't have a hearing aid on them). In 210, the audio receiver is configured. This requires that the device used to capture the sounds from the environment is activated and able to perform its function. In an example embodiment, if the system is an app on a mobile device, the app must be allowed by the user to access the microphone on the device. Similarly, if the audio input is coming from a device like Alexa, the system should have proper API access enabled to get the audio inputs. After the system is configured, in 215, it will wait for a signal to be received based on the set preferences. If no interesting signal is received, the system will continuously loop back to the audio receiver until appropriate audio input in 220 is found. Once a signal is received, it is processed and analyzed in 225. This includes isolating and classifying the sound, and this process is further described by FIG. 3. After the system determines what the sound is, step 230 checks if the detected sound or category matches what was configured in user preferences 205. If a valid notification criterion is met, the user is notified in step 240, otherwise no notification is generated. Note that the system may still log the event although the user may not have been notified. The system executes the event loop 235 endlessly till the application is terminated.

Figure 3:
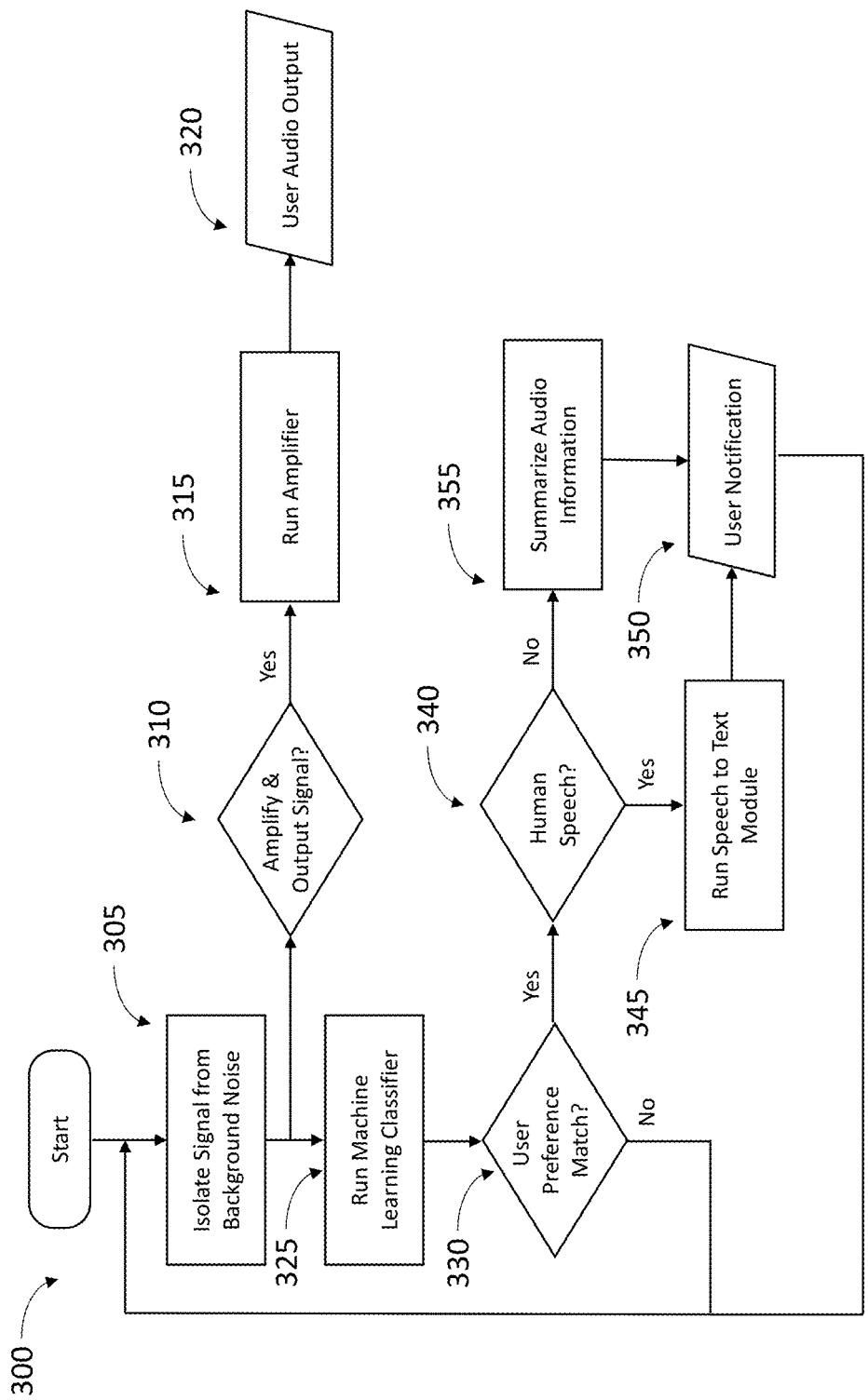
FIG. 3 is a high-level flowchart of the analysis and processing steps that capture ambient sound signals and notify the hearing-impaired user based on preferences.

FIG. 3 demonstrates the core processing and analysis steps. In 305 the audio signal to be processed is isolated from other background noises. Generally, this would mean that a valid audio signal above the noise threshold has been received. The received signal is run through digital signal processing filters that improve the fidelity and quality of the received sound, to assist downstream processing and detection. Once the sound has been isolated and filtered, step 310 checks to see if the user wants the specific sound to be amplified and sent to them. If it is, 315 will run the amplifier which will increase the audio signal strength and condition it so that it can be easily perceived by individuals experiencing hearing loss. In 320, the improved sound will be outputted to the user through their listening device (e.g. headset). A copy of the audio signal may also be stored digitally. If the user is completely void of hearing and needs the sound to be communicated to them in another way, or if the user wants the system to detect and notify regardless, it will then have to be classified into a specific category so that eventually the sound can be identified. Step 325 runs the machine learning classifier which takes the audio signal as input and outputs a most likely audio category (e.g. Animal Sounds, Emergency, Devices, Vehicles, Speech, Music, etc.) and specific audio type (e.g. Dog Barking, Ambulance Siren, Telephone Ring, Garbage Truck, English Conversation, Piano, etc.) that matches a pre-determined set of audio categories and types that the model has been trained to identify. Once audio category and type is determined, step 330 checks whether the user cares to be notified about the detected audio category and type based on preferences set before. If not, the system goes back to step 305 where it tries to collect new audio samples for analysis. If the user does want to be notified of the sound, the system checks if the determined category was human speech in 340. If so, it proceeds to 345 where it runs the speech to text module which extracts text from the human voice signal and sends it to the notification system 350. If it is not human speech, the audio information is summarized in 355 and the summary is sent to the notification system 350. For example, the system may have detected audio type Ambulance Siren of category Emergency. That information, along with the date, time duration and other relevant information may be sent to the user's notification system (e.g. a mobile phone alert).

Figure 4:
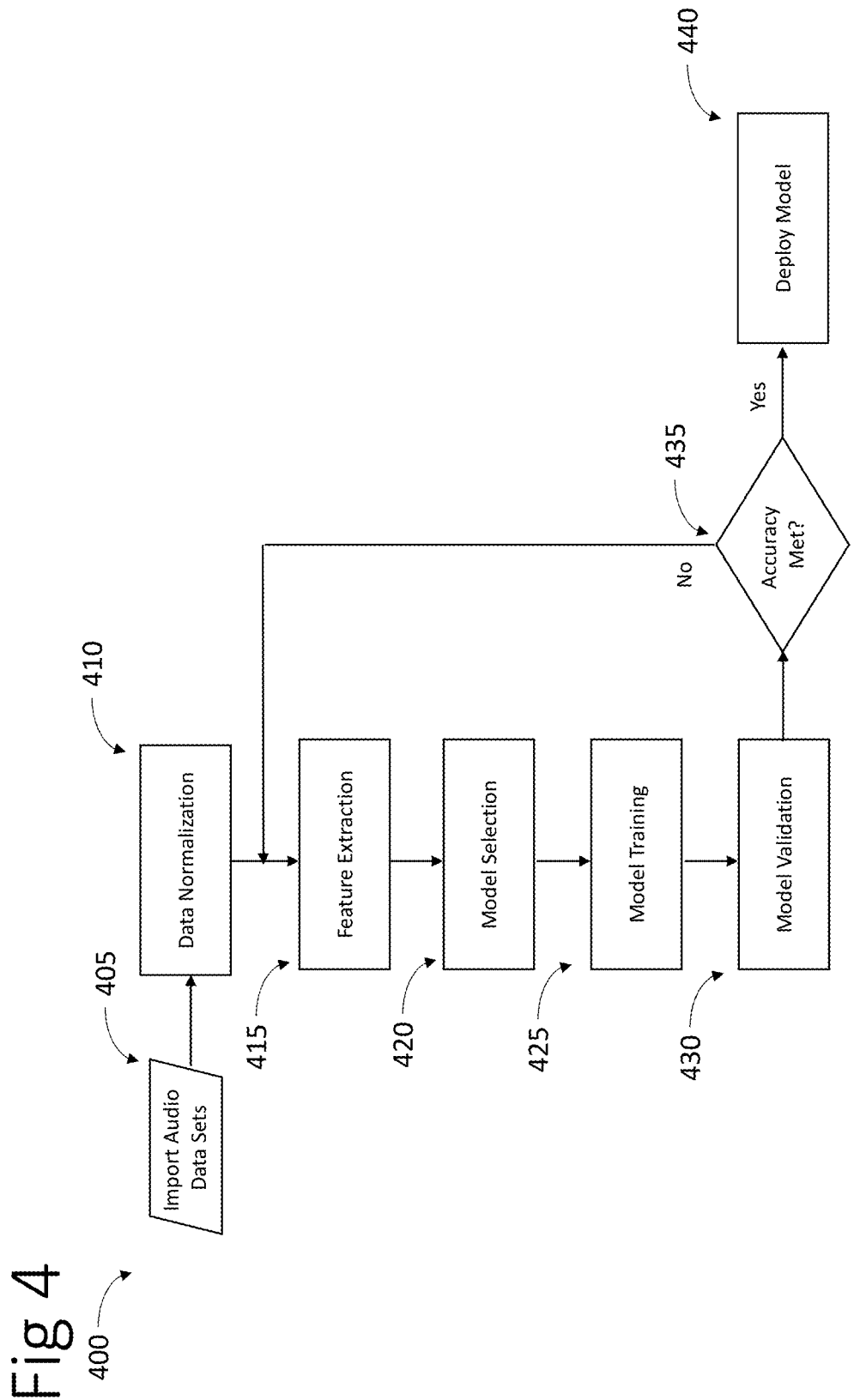
FIG. 4 is a flowchart of the method used to train the machine learning model to classify sounds.

FIG. 4 represents the steps used to train the machine learning classifier 325. In 405, audio data sets including both the training and validation sets is imported. A variety of free and commercial audio data sets are available online. For example, Google AudioSet (Gemmeke, 2017) is collection of roughly 2.1 million audio clips, each 10 seconds long, extracted and labelled from YouTube. Similarly, the UrbanSound8K dataset (Salamon, 2014) contains over 8,000 labeled sound files each approximately 4 seconds long and of sounds encountered in a typical urban environment and labelled into 10 classes. The FSD project uses crowdsourcing of annotations of audio samples from Freesound organised using the AudioSet framework (Fonseca, 2019). Data sets can also be generated manually by recording sounds and labeling them. This data is then normalized in 410. This process includes developing a consistent format to label and organize audio samples. In 415, features will then be extracted from the audio set. For example, differences in frequency, pitch, tone, intensity, etc. can be used to distinguish between different audio samples. Step 420 selects the model that best classifies and trains the data set using data science principles. This may be as simple as decision trees, regression or k-nearest neighbors, or it could be as advanced as a deep learning neural network. In 425, the model is trained to classify audio samples to appropriate category and type based on extracted features. A portion of the data set is used for training and the rest is used to validate the model in 430. The process is then repeated in 435 till an acceptable level of model prediction accuracy is reached, based on precision, accuracy, and recall. Once the model is trained, step 440 deploys it to the system described in FIG. 3. The model can periodically be retrained based on the availability of new data sets or user feedback.

Figure 5:
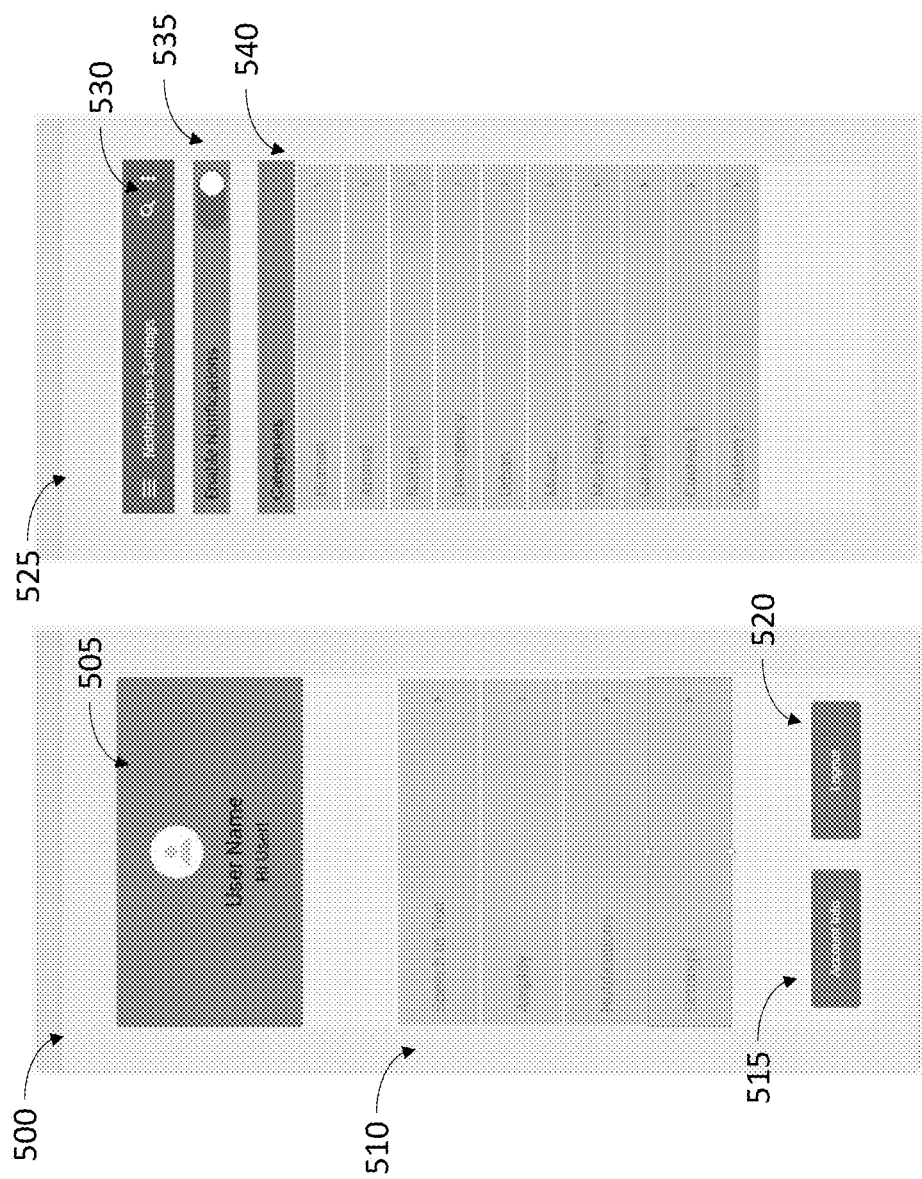
FIG. 5 is a mobile device app showing examples of user configuration options.

FIG. 5 illustrates an example embodiment of the user's view of the system. It includes a sample 500 of the home screen of the user's interface, and an example of a settings page 530 that can be integrated into a mobile application. 505 displays a brief summary of the user's profile including a portrait of them and their name. This shows that they are logged into their profile and ensures that the application is running with their configured preferences. 510 illustrates four main functions of the application—speech to text, amplifier, notifications, and settings. FIG. 6 describes these functions. In 515, the user can click to view or update their account information. This may include their profile, account settings, as well as other important information that pertains to their condition so the system can cater to those needs. 520 allows the user to logout of their account. This may be useful if they want to temporarily disable the system, or if they wish to switch to another user's account with different settings (e.g. a shared device in school). 530 exemplifies a sample of the settings page of the user's system. 535 allows them to choose whether they want to allow notifications to be outputted on their device. If the switch is on, notifications will be sent to the user each time one of their preferred sounds is detected. If it is off, no notifications will be sent to the user although data will continue to be collected and stored. 540 exhibits sample categories the user may prefer to be notified of. For example, if they wish to be notified of any Animal Sounds, they choose that Animal Sounds category and specify specific audio types (e.g. Dog Barking) or all audio types in the category. The system could also provide feedback to the application developer to improve model training based on frequently requested categories.

FIG. 6 is an example embodiment of the user's interactions with the system. 600 represents one of the functions of the system—speech to text conversion. This can be used to convert human speech into text. 605 is the menu bar that can be found on each page. By pressing the three horizontal bars, the user will be returned to the home screen 500. Similarly, the search icon after it can be used to search for anything in the system, and the three dots allows the user to customize specific settings for each page (e.g. language, volume, etc.). If the microphone icon 610 is pressed, the message "Listening . . . " will be presented to show the system is activated. It will continue to show this message until 610 is pressed again to stop transcribing the audio signal. As the speech is being captured, its text will be transcribed in real-time in the text-box 615. 620 shows the amplifier feature of the system. Similar to 610, when the speaker icon 625 is selected, it will activate the amplifier. The user can adjust what volume they want the sound to be amplified to using the slider 630. While the amplifier is running, the message 635, "Playing on Device . . . " or another similar message will be outputted so the user knows that it is properly functioning. When the sound is amplified and is being played back, 640 depicts an animation of the time domain samples of the sound waves as it is being played back. 650 is a sample of the notifications page of the application. 655 allows the user to view past notifications from the last 24 hours, or from the last 7 days, for example. 660 is an example embodiment of notifications that might be sent to the user. It includes the category of the notification (e.g. Animal Sounds, Emergency, Devices, Vehicles, Speech, Music, etc.), specific audio type (e.g. Dog Barking, Ambulance Siren, Telephone Ring, Garbage Truck, English Conversation, Piano, etc.) and time when the alert was generated.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

REFERENCES

World Health Organization: WHO. (2019, March 20). Deafness and hearing loss. https://www.who.int/news-room/fact-sheets/detail/deafness-and-hearing-loss WebMD. (2012, May 14). Treatments for Hearing Loss. https://www.webmd.com/a-to-z-guides/hearing-loss-treatment-options National Institute on Deafness and Other Communication Disorders: NIDCD. (2019, November 12). Assistive Devices for People with Hearing, Voice, Speech, or Language. https://www.nidcd.nih.gov/health/assistive-devices-people-hearing-voice-speech-or-language-disorders Department of Health (2005). Mental health and deafness—Towards equity and access: Best practice guidance. London, UK: HMSO Hearing Loss Association of America: HLAA. (2019). Types, Causes and Treatments, https://www.hearingloss.org/hearing-help/hearing-loss-basics/ypes-causes-and-treatment/

National Institute on Deafness and Other Communication Disorders: NIDCD. (2018, June 15). Hearing Aids. https://www.nidcd.nih.gov/health/hearing-aids Rains, T. (2019, September 13). How much do hearing aids cost?https://www.consumeraffairs.com/health/hearing-aid-cost.html Wikipedia. (2019b, November 24). Cochlear implant. https://en.wikipedia.org/wiki/Cochlear_implant Gallaudet University and Clerc Center. (2019). Assistive Technologies for Individuals Who are Deaf or Hard of Hearing. https://www3.gallaudet.edu/clerc-center/info-to-go/assistive-technology/assistive-technologies.html Apple. (2019, September 19). Use Live Listen with Made for iPhone hearing aids. https://support.apple.com/en-us/HT203990

Gemmeke, J. (2017). Audio Set: An ontology and human-labeled dataset for audio events. https://research.google.com/audioset/

Salamon, J. (2014). A Dataset and Taxonomy for Urban Sound Research. https://urbansounddataset.weebly.com/

Fonseca, E. (2019). Freesound Datasets: A Platform for the Creation of Open Audio Datasets. https://annotator.freesound.org/fsd/explore/

What is claimed is:

1. A system comprising:
   an audio receiver;
   a processing system connected to the audio receiver;
   a notification system connected to the processing system,
   wherein the processing system is configured to
      i) obtain audio signal from the audio receiver;
      ii) process the audio signal to reduce noise and interference and check if the audio signal contains appropriate audio;
      iii) responsive to the audio signal containing appropriate audio, run a machine learning based classifier to analyze the audio signal, otherwise loop back to i);
      iv) classify the audio signal into an audio category and audio type based on the machine learning based classifier, wherein the audio category includes one of animal sounds, emergency sounds, device sounds, vehicle sounds, speech, and music, and wherein the audio type is one of a plurality of types specific to each audio category;
      v) notify a user via the notification system of the detected audio category and type; wherein, for the notification, the user is presented with text associated with the classified audio, and, for the specific type of audio, the user is presented with a meaningful description of what the machine learning process characterized the isolated signals as that includes the audio type and additional relevant information, wherein, when the audio category is speech, the meaningful description includes text that corresponds to the speech based on a conversion; and
      vi) loop back to i).

2. The system of claim 1, wherein the processing system has a filter and an amplifier to output an improved copy of the received audio signal to a user's hearing device or store it digitally.

3. The system of claim 1, wherein the notification system is a mobile device push notification configured by the user.

4. The system of claim 1, wherein the notification system is a wearable device that can generate vibration alerts and display information on a digital screen.

5. The system of claim 1, wherein the notification preferences can be configured by the user based on audio category and audio type.

6. The system of claim 1, wherein the machine learning classifier is periodically trained externally based on labelled audio sample data and updated in the system.

7. The system of claim 6, where the machine learning training system is further configured to
receive feedback from the user that the detected audio category and type were incorrect or unknown, and
process the feedback for the labelled audio sample data including a new audio category and a new audio type when the feedback identifies the new audio category and the new audio type.

8. The system of claim 1, where the entire system is running as an application on a mobile phone, wherein the audio receiver is the microphone on the mobile device, the processing system is the CPU on the mobile device and the notification system is the screen and vibration alerts.

9. The system of claim 1, wherein the audio receiver is a separate device communicatively coupled to the processing system running on mobile device.

10. A method comprising:
i) obtaining audio signal from the audio receiver;
ii) processing the audio signal to reduce noise and interference and checking if the audio signal contains appropriate audio;
iii) responsive to the audio signal containing appropriate audio, running a machine learning based classifier to analyze the audio signal, otherwise looping back to i);
iv) classifying the audio signal into an audio category and audio type, wherein the audio category includes one of animal sounds, emergency sounds, device sounds, vehicle sounds, speech, and music, and wherein the audio type is one of a plurality of types specific to each audio category;
v) notifying a user via the notification system of the detected audio category and type; wherein, for the notification, the user is presented with text associated with the classified audio, and, for the specific type of audio, the user is presented with a meaningful description of what the machine learning process characterized the isolated signals as that includes the audio type and additional relevant information, wherein, when the audio category is speech, the meaningful description includes text that corresponds to the speech based on a conversion; and
vi) looping back to i).

11. The method of claim 10, further comprising of an amplifier and filter to output an improved copy of the received audio signal to a user's hearing device or store it digitally.

12. The method of claim 10, wherein the notification method is a mobile device push notification.

13. The method of claim 10, wherein the notification method uses a wearable device that can generate vibration alerts and display information on a digital screen.

14. The method of claim 10, wherein the notification preferences can be configured by the user based on audio category and audio type.

15. The method of claim 10, wherein the machine learning classifier is periodically trained externally based on labelled audio sample data and updated.

16. The method of claim 10, where the machine learning training includes steps to
receive feedback from the user that the detected audio category and type were incorrect or unknown, and
process the feedback for the labelled audio sample data including a new audio category and a new audio type when the feedback identifies the new audio category and the new audio type.

17. A non-transitory computer-readable medium comprising instructions that, when executed, cause a processing system to perform the steps of:
i) obtaining audio signal from the audio receiver;
ii) processing the audio signal to reduce noise and interference and checking if the audio signal contains appropriate audio;
iii) responsive to the audio signal containing appropriate audio, running a machine learning based classifier to analyze the audio signal, otherwise looping back to i);
iv) classifying the audio signal into an audio category and audio type, wherein the audio category includes one of animal sounds, emergency sounds, device sounds, vehicle sounds, speech, and music, and wherein the audio type is one of a plurality of types specific to each audio category;
v) notifying a user via the notification system of the detected audio category and type; wherein, for the notification, the user is presented with text associated with the classified audio, and, for the specific type of audio, the user is presented with a meaningful description of what the machine learning process characterized the isolated signals as that includes the audio type, wherein, when the audio category is speech and additional relevant information, the meaningful description includes text that corresponds to the speech based on a coversion; and
vi) looping back to i).

* * * * *